United States Patent [19]

Tiong

[11] Patent Number: 5,788,593
[45] Date of Patent: Aug. 4, 1998

[54] MULTIPLE SPROCKET ASSEMBLY ADAPTED TO SECURE A SPROCKET TO AN OUTER RACE

[75] Inventor: Khoo Kean Tiong, Singapore, Singapore

[73] Assignee: Shimano (Singapore) Private, Limited, Singapore

[21] Appl. No.: 725,116

[22] Filed: Oct. 2, 1996

[51] Int. Cl.⁶ .................................................. F16H 9/24
[52] U.S. Cl. .................................................. 474/160
[58] Field of Search ........................ 474/77, 78, 158, 474/160, 164; 74/594.2; 192/64; 280/238; 384/545

[56] References Cited

U.S. PATENT DOCUMENTS

| | | | |
|---|---|---|---|
| 4,121,474 | 10/1978 | Arregui Suinaga | 474/160 |
| 4,145,095 | 3/1979 | Segawa . | |
| 4,278,265 | 7/1981 | Nagano | 280/160.1 |
| 4,328,882 | 5/1982 | Isobe | 192/64 |
| 4,400,999 | 8/1983 | Steuer | 74/781 B |
| 4,486,184 | 12/1984 | Campagnolo | 474/165 |
| 4,840,084 | 6/1989 | Durham | 74/594.1 |
| 5,194,051 | 3/1993 | Nagano | 474/160 |
| 5,480,357 | 1/1996 | Liang | 474/160 X |

FOREIGN PATENT DOCUMENTS

| | | | |
|---|---|---|---|
| 2612870 | 9/1988 | France | 474/160 |
| 1202886 | 8/1970 | United Kingdom | 192/64 |

*Primary Examiner*—Thomas R. Hannon
*Attorney, Agent, or Firm*—James A. Deland

[57] ABSTRACT

A multiple sprocket apparatus for a bicycle includes an inner race and an outer race having first and second end faces rotatably supported by the inner race. The outer race has first end second end faces and is structured for supporting a plurality of first sprockets on an outer peripheral surface thereof and aligned between the first and second end faces. The second end face includes fastening devices for fastening a second sprocket thereto.

23 Claims, 7 Drawing Sheets

MULTIPLE SPROCKET ASSEMBLY ADAPTED TO SECURE A SPROCKET TO AN OUTER RACE

BACKGROUND OF THE INVENTION

The present invention is directed to multiple sprocket assemblies used on bicycles and, more particularly, to a multiple sprocket assembly which secures one or more sprockets to an outer race of the assembly body.

Conventional multiple sprocket assemblies such as freewheels comprise an inner race, an outer race rotatably supported on the inner race by a plurality of ball bearings, and a ratchet/pawl mechanism disposed between the inner race and the outer race for allowing rotation of the outer race relative to the inner race in only one direction. A plurality of sprockets are usually mounted on the outer peripheral surface of the outer race and are held in place by the smallest or outermost sprocket which has a threaded inner peripheral surface that screws to a threaded portion of the outer peripheral surface of the outer race.

In such conventional freewheels, the position of the sprocket teeth on one sprocket relative to the sprocket teeth on an adjacent sprocket is not critical, so using a small sprocket which screws to the outer race is quite acceptable. However, some multiple sprocket assemblies employ special chain shifting structures on the sprockets. Such chain shifting structures, especially those employed in multiple sprocket assemblies mounted on a freehub sold by the present assignee under the HYPERGLIDE® trademark, are quite desirable because they ensure proper chain shifting even under severe riding conditions. In order to function properly, the chain shifting structures must be specially positioned from one sprocket to another, and this is accomplished by a splined coupling between the sprockets and the outer race. Of course, such multiple sprocket assemblies cannot use a threaded small sprocket since the ultimate position of a threaded sprocket is not fixed. Consequently, the smallest sprocket is usually fixed in place on the outer race using a splined coupling, and all sprockets are retained to the assembly body by a lock ring which screws to a threaded portion of the outer race and which is positioned adjacent to the smallest sprocket.

In order to accommodate the lock ring while keeping the depth of the multiple sprocket assembly to a minimum, the lock ring sometimes includes a cylindrical portion which fits partially inside the smallest sprocket. However, this construction limits the minimum inside diameter of the smallest sprocket which, in turn, limits the minimum number of teeth on the smallest sprocket. Known multiple sprocket assemblies constructed in this way have a limit of 13 teeth for the smallest diameter sprocket. Thus, if the cyclist wants a sprocket with fewer teeth, he or she must settle for a conventional multiple sprocket assembly without the desirable chain shifting structures.

SUMMARY OF THE INVENTION

The present invention is directed to a multiple sprocket assembly such as a freewheel or freehub which employs chain shifting structures on the sprockets while also allowing the use of a small number of teeth on the smallest sprocket. In one embodiment of the present invention, a multiple sprocket apparatus for a bicycle includes an inner race and an outer race rotatably supported by the inner race. The outer race has first and second end faces and is structured for supporting a plurality of first sprockets on an outer peripheral surface thereof and aligned between the first and second end faces. The second end face includes fastening means for fastening a second sprocket thereto.

In a more specific embodiment of the present invention, a multiple sprocket apparatus for a bicycle includes an inner race and an outer race having first and second end faces rotatably supported by the inner race. A plurality of first sprockets are disposed on an outer peripheral surface of the outer race and are aligned between the first and second end faces of the outer race. A second sprocket includes one or more openings on a side thereof, and the outer race includes one or more threaded openings on the second end face which align with the openings in the second sprocket. Threaded bolts pass through the openings in the second sprocket and into the threaded openings in the outer race for fixing the second sprocket to the outer race.

In another embodiment of the present invention, the second sprocket includes a ledge extending from a side thereof, and a third sprocket is disposed on the ledge. The third sprocket may be formed integrally with the ledge, but the third sprocket also may be retained on the ledge by a lock ring, by welding, screwing etc.

DETAILED DESCRIPTION OF THE EMBODIMENTS

Figure 1A:
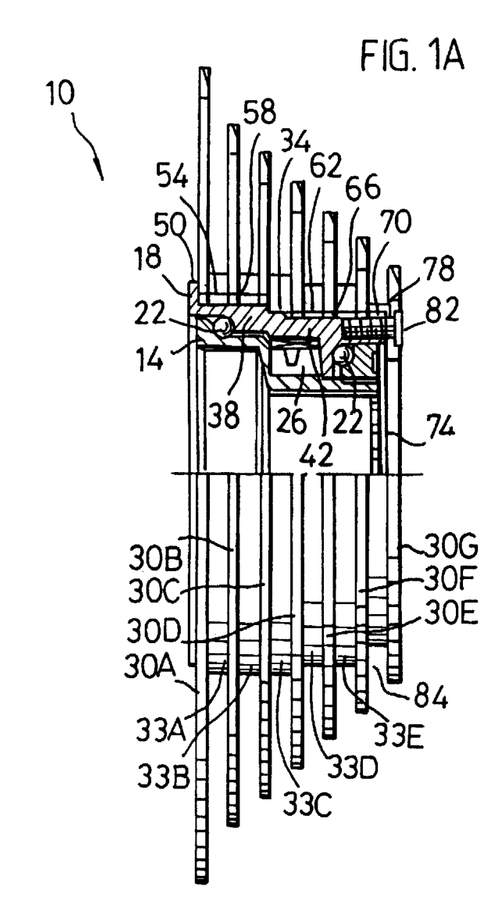
FIG. 1A is a partial cross sectional view of a particular embodiment of a multiple sprocket assembly according to the present invention.
Figure 1B:
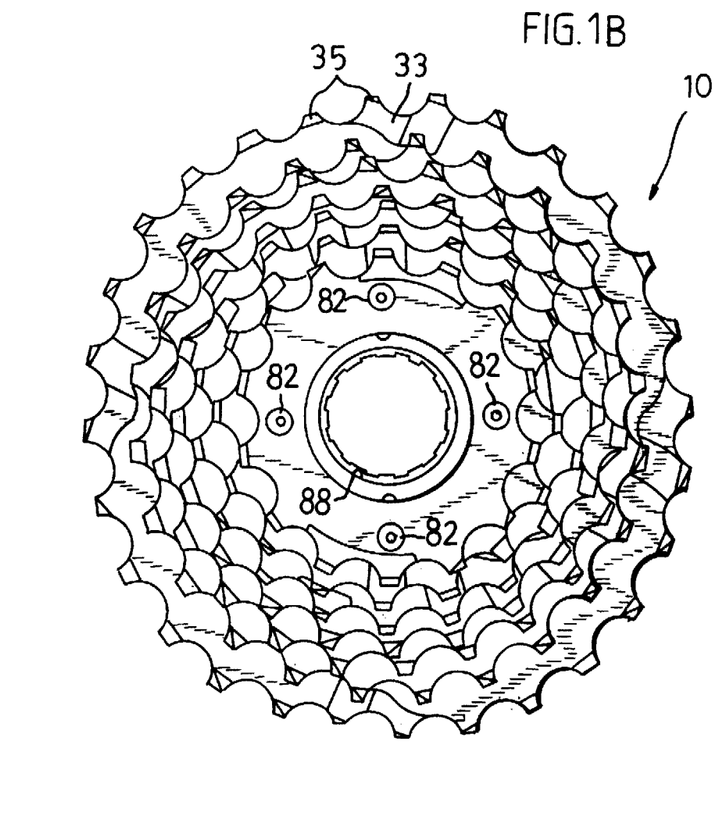
FIG. 1B is a front view of the assembly shown in FIG. 1.
Figure 1C:
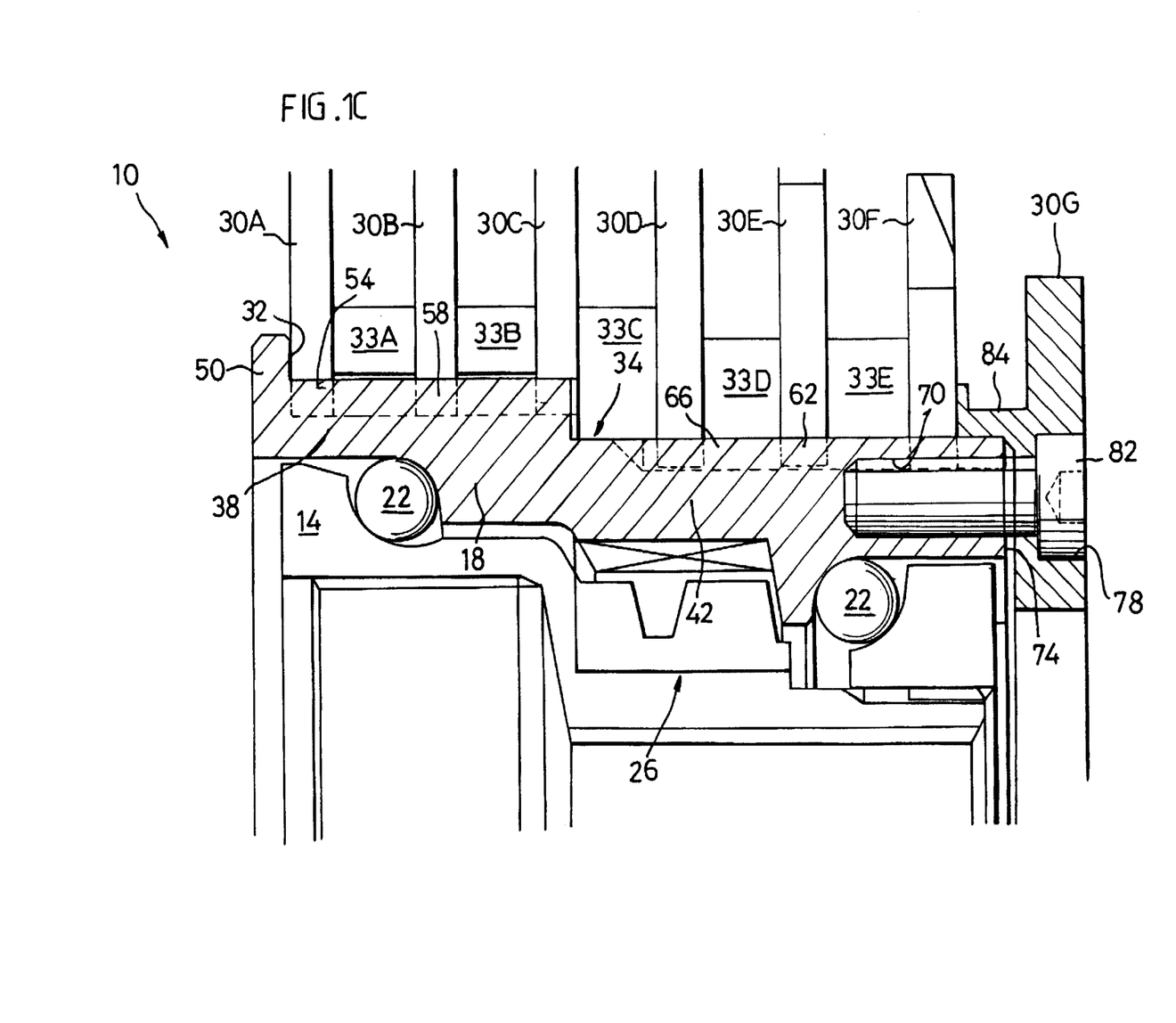
FIG. 1C is a magnified view of components of the multiple sprocket assembly shown in FIG. 1A.

FIGS. 1A and 1B are partial cross sectional and front views, respectively, of a particular embodiment of a multiple sprocket assembly 10 according to the present invention. In this embodiment, assembly 10 is in the form of a freewheel structure, but the teachings of the present invention could be applied to a freehub assembly. FIG. 1C is a magnified view of the components of the freewheel shown in FIG. 1A. As shown in those figures, freewheel assembly 10 includes an inner race 14, an outer race 18, and a plurality of ball bearings 22 which rotatably support outer race 18 on inner race 14. A well-known ratchet/pawl mechanism 26 is disposed between inner race 14 and outer race 18 for allowing rotation of outer race 18 relative to inner race 14 in only one direction. A plurality of sprockets 30A–30F are fitted to an outer peripheral surface 34 of outer race 18 between end faces 32 and 74 thereof. In this embodiment, spacers 33A–33E are disposed between the sprockets 30A–30F. Spacers 33A–33E may comprise separate rings or be formed as one piece with individual sprockets.

Outer race 18 includes stepped cylindrical portions 38 and 42, and a flange 50 extends radially outwardly from one end of cylindrical portion 38 for abutting against sprocket 30A. As shown in FIG. 1B, each sprocket employs chain shifting structures such as chain ramps 33 and/or specially configured sprocket teeth 35. These chain shifting structures must be properly aligned from one sprocket to another. To accomplish this, stepped portion 38 includes splines 54 for engaging splines 58 on the inner peripheral surfaces of sprockets 30A–30C, and cylindrical portion 42 includes splines 62 for engaging splines 66 on the inner peripheral surface of sprockets 30D–30F. This fixes each sprocket in the proper position.

A plurality of threaded openings 70 are formed in the end face 74 of outer race 18, and a corresponding plurality of openings 78 are formed in the side surface of a sprocket 30G. In this embodiment, threaded screws or bolts 82 extend through openings 78 into threaded openings 70 for securing sprocket 30G to end face 74 so that a flange 84 of sprocket 30G contacts sprocket 30F. Of course, flange 84 may be formed as a separate spacer ring. In this embodiment, bolts 82 are allen head bolts, but other types of bolts may be used instead. Since sprocket 30G is fitted to the end face 74 of outer race 18, the inner peripheral surface 88 of sprocket 30G can be smaller than the inner peripheral surfaces of the other sprockets, and the number of teeth on sprocket 30G can be reduced accordingly. Additionally, a spacer is not required, so the freewheel can be thinner than prior art freewheels.

Figure 2A:
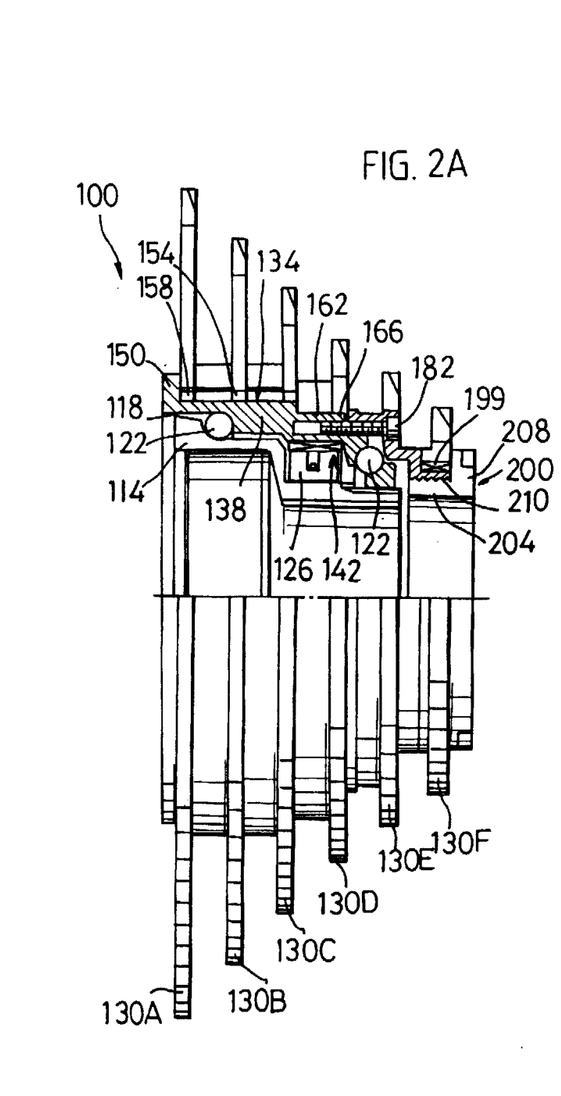
FIG. 2A is a partial cross sectional view of an alternative embodiment of a multiple sprocket assembly according to the present invention.
Figure 2B:
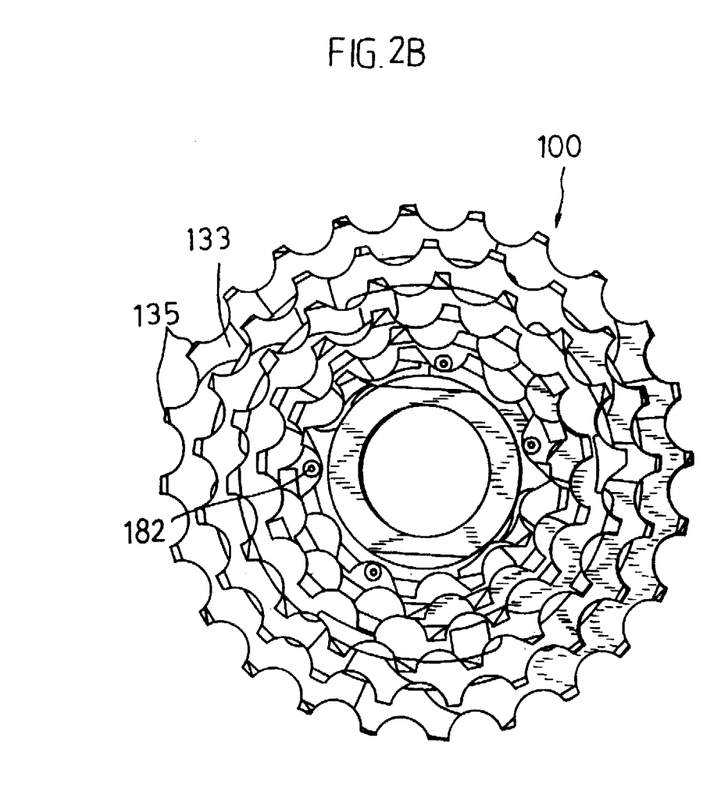
FIG. 2B is a front view of the assembly shown in FIG. 2A.
Figure 2C:
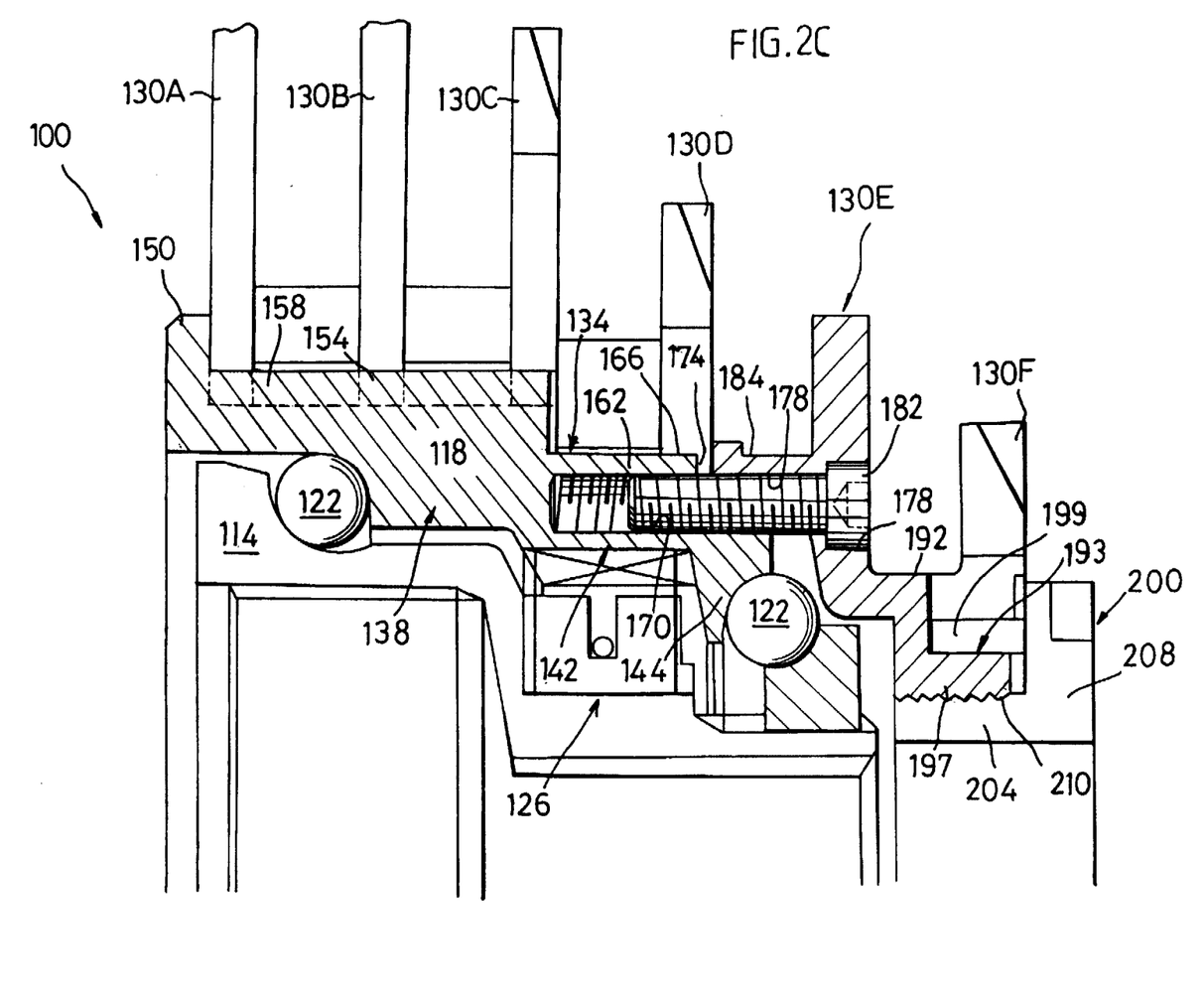
FIG. 2C is a magnified view of components of the multiple sprocket assembly shown in FIG. 2A.

FIGS. 2A and 2B are partial cross sectional and front views, respectively, of an alternative embodiment of a multiple sprocket freewheel assembly 100 according to the present invention. FIG. 2C is a magnified view of the components of the freewheel shown in FIG. 2A. As shown in those figures, freewheel assembly 100 includes an inner race 114, an outer race 118, and a plurality of ball bearings 122 which rotatably support outer race 118 on inner race 114. A well-known ratchet/pawl mechanism 126 is disposed between inner race 114 and outer race 118 for allowing rotation of outer race 118 relative to inner race 114 in only one direction. A plurality of sprockets 130A–130D are fitted to an outer peripheral surface 134 of outer race 118.

Outer race 118 includes stepped generally cylindrical portions 138, 142 and 144, and a flange 150 extends radially outwardly from one end of cylindrical portion 138 for abutting against sprocket 130A. As in the first embodiment, each sprocket includes chain shifting structures such as chain ramps 133 and/or specially configured teeth 135. To properly position the sprockets, cylindrical portion 138 includes splines 154 for engaging splines 158 on the inner peripheral surfaces of sprockets 130A–130C, and cylindrical portion 142 includes splines 162 for engaging splines 166 on the inner peripheral surface of sprocket 130D.

Figure 3:
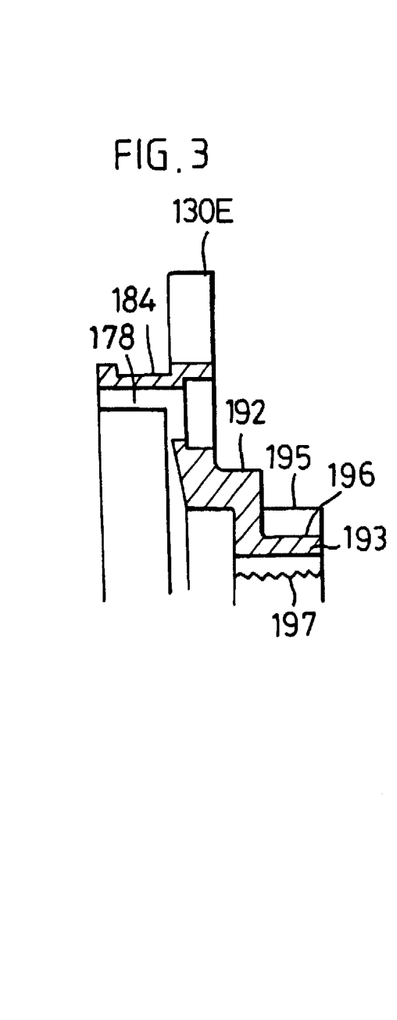
FIG. 3 is a partial cross sectional view of a particular embodiment of the penultimate sprocket used in the assembly shown in FIGS. 2A–2C.

As shown more clearly in FIGS. 2C and 3, a plurality of threaded openings 170 are formed in the end face 174 of outer race 118, and a corresponding plurality of openings 178 are formed in the side surface of a sprocket 130E. In this embodiment, threaded screws or bolts 182 extend through openings 178 into threaded openings 170 for securing sprocket 130E to end face 174 so that a flange 184 of sprocket 130E fits on cylindrical portion 144 of outer race 118 and contacts sprocket 130D. Of course, flange 184 may be formed as a separate spacer ring. In this embodiment, bolts 182 are allen head bolts, but other types of bolts may be used instead.

Sprocket 130E includes a first ledge 192 and a second ledge 193 which is disposed radially inwardly from first ledge 192. A plurality of splines 195 are disposed on the outer peripheral surface 196 of second ledge 193, and an inner peripheral surface 197 of second ledge 193 forms a threaded surface. A sprocket 130F having complementary splines 199 is fitted to the outer peripheral surface of second ledge 193.

A lock ring 200 maintains sprocket 130F in place on second ledge 193. Lock ring 200 comprises a cylindrical portion 204 and a flange 208 which extends radially outwardly from cylindrical portion 204. An outer peripheral surface 210 of cylindrical portion 204 is threaded for meshing with the threaded inner peripheral surface 197 of second ledge 193. Flange 208 abuts against sprocket 13OF when lock ring 200 is screwed into ledge 193.

Because of the reduced diameter of ledge 193, sprocket 130F may have fewer teeth than if sprocket 130F was fitted to the outer peripheral surface of outer race 118. In this embodiment, sprocket 130F has eleven teeth. However, sprocket 130F may be formed with even fewer teeth by making second ledge 193 the appropriate size.

Figure 4:
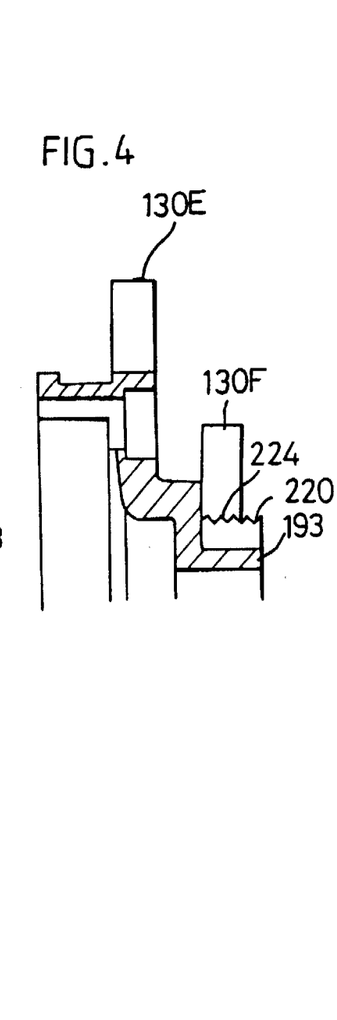
FIG. 4 is a partial cross sectional view of an alternative embodiment of a penultimate sprocket which can be used in the assembly shown in FIGS. 2A–2C.

FIG. 4 is a partial cross sectional view of an alternative embodiment of sprocket 130E. In this embodiment, an outer peripheral surface 220 of second ledge 193 is threaded for meshing with a threaded inner peripheral surface 224 of sprocket 130F. In this embodiment, sprocket 130F may be screwed directly onto sprocket 130E without using a lock ring.

Figure 5:
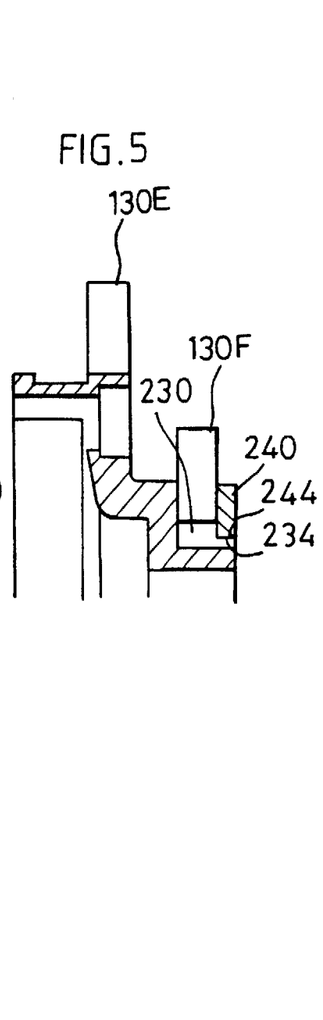
FIG. 5 is a partial cross sectional view of another embodiment of a penultimate sprocket which can be used in the assembly shown in FIGS. 2A–2C.

FIG. 5 is a partial cross sectional view of another alternative embodiment of sprocket 130E. In this embodiment, an outer peripheral surface of second ledge 193 includes a splined portion 230 and a threaded portion 234. Sprocket 130F fits to splined portion 230 in the same manner shown in FIG. 3, but in this embodiment an annular lock ring 240 having a threaded inner peripheral surface 244 is screwed onto threaded portion 234 for maintaining sprocket 130F in place.

Figure 6:
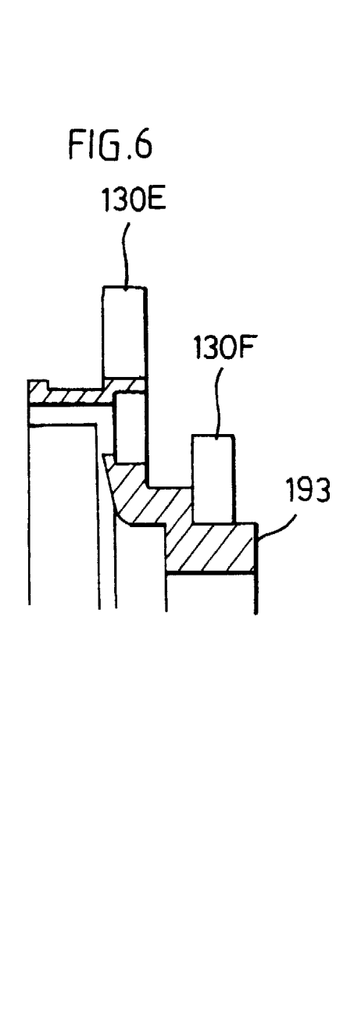
FIG. 6 is a partial cross sectional view of another embodiment of a penultimate sprocket which can be used in the assembly shown in FIGS. 2A–2C.

FIG. 6 is a partial cross sectional view of another alternative embodiment of sprocket 130E. In this embodiment, sprocket 130F is formed as one piece with ledge 193.

Figure 7:
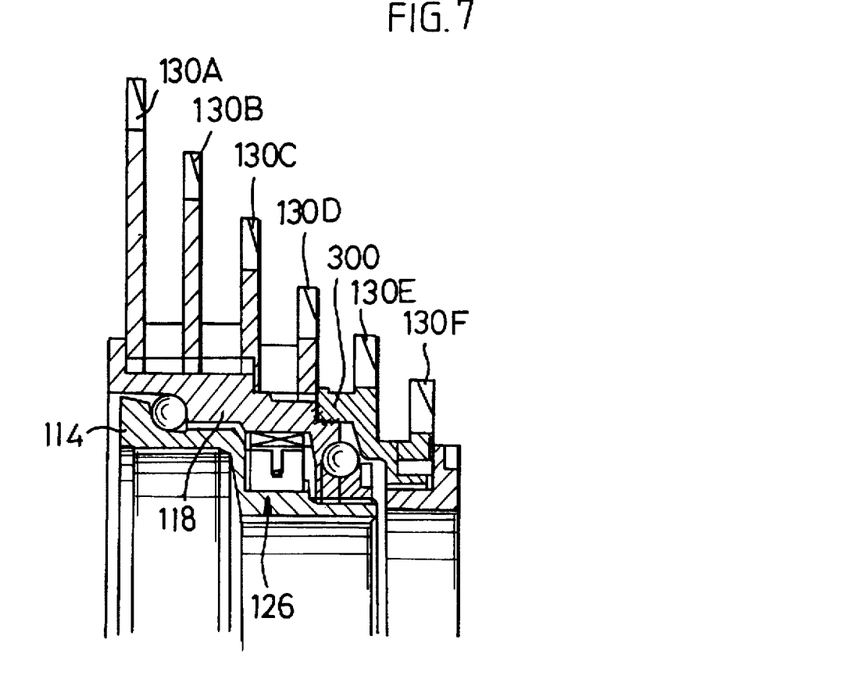
FIG. 7 is a partial cross sectional view of another alternative embodiment of a multiple sprocket freewheel according to the present invention.
Figure 8:
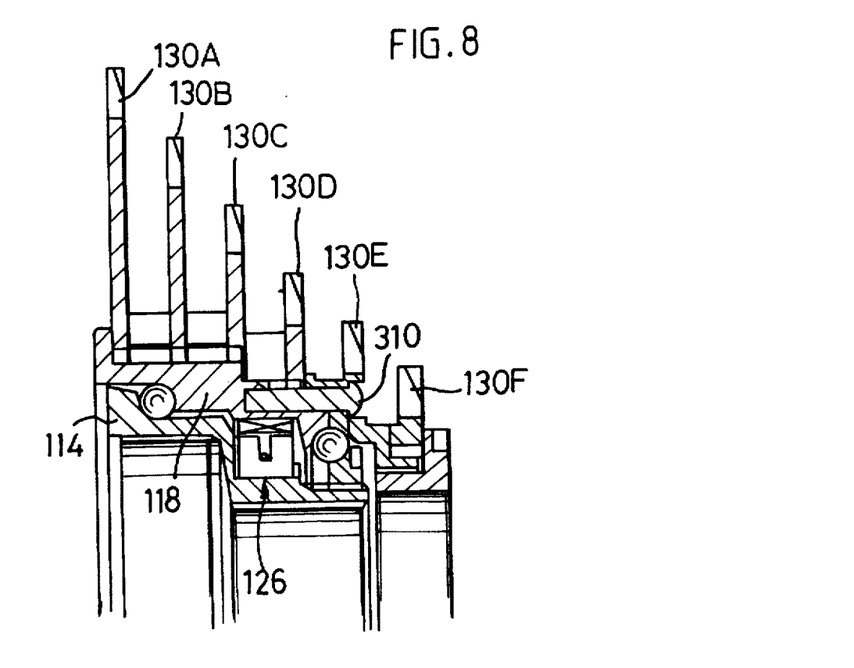
FIG. 8 is a partial cross sectional view of another alternative embodiment of a multiple sprocket freewheel according to the present invention.
Figure 9:
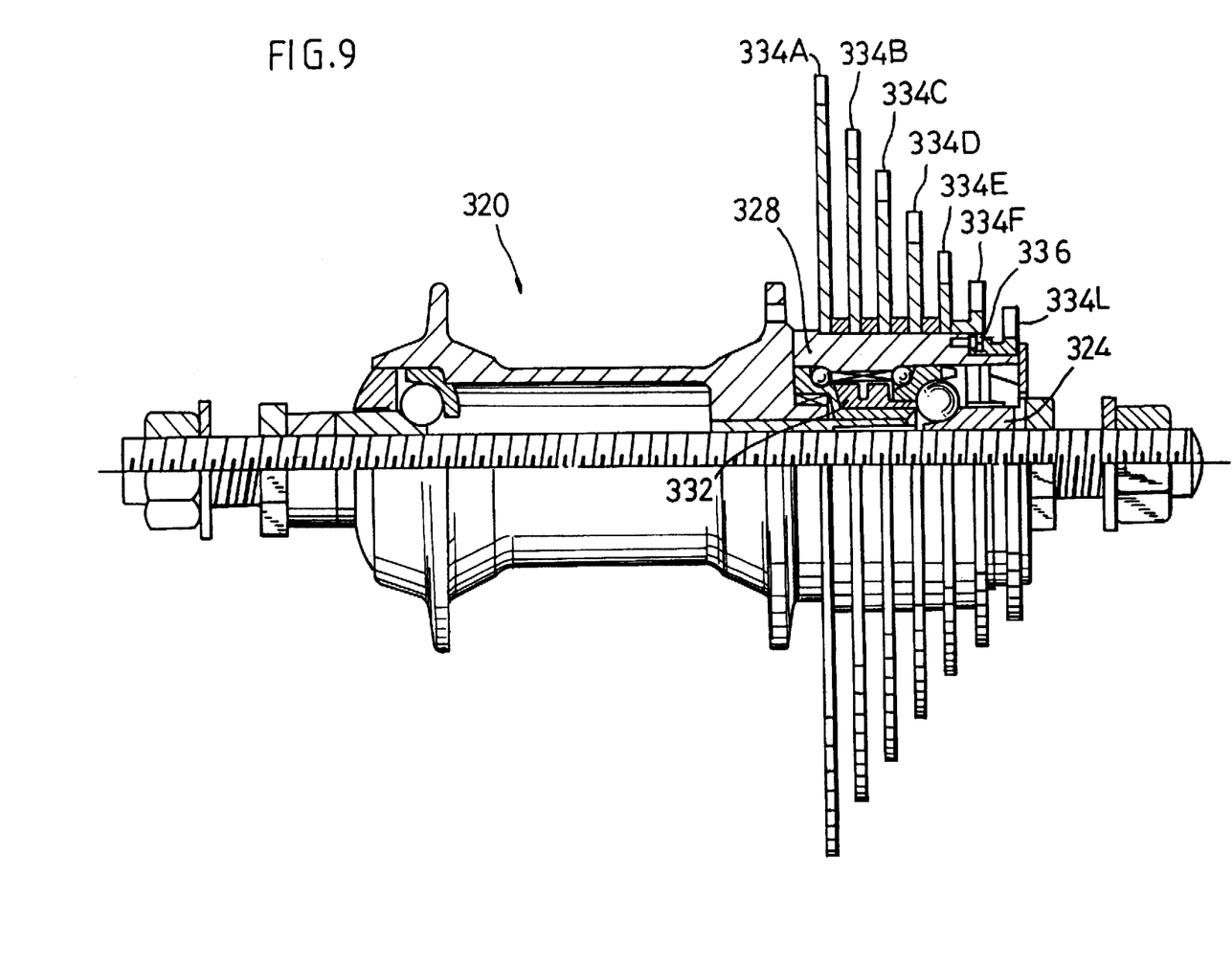
FIG. 9 is a partial cross sectional view of an alternative embodiment of a multiple sprocket freewheel according to the present invention.

While the above is a description of various embodiments of the present invention, further modifications may be employed without departing from the spirit and scope of the present invention. For example, sprockets 130E and 130F may be fixed to outer race 118 weld 300 as shown in FIG. 7, by a rivet 310 as shown in FIG. 8, or by some other means. Further ledges may be provided on the end of ledge 193 to accommodate additional smaller sprockets. The teachings of the present invention also may be applied to a freehub 320 having an inner race 324, an outer race 328, a ratchet mechanism 332, sprockets 334A–G, and a fastener 336 for fixing sprocket 334F to outer race 328 as shown in FIG. 9. Thus, the scope of the invention should not be limited by the specific structures disclosed. Instead, the true scope of the invention should be determined by the following claims.

What is claimed is:

1. A multiple sprocket apparatus for a bicycle comprising:
   an inner race;
   an outer race rotatably supported by the inner race, the outer race having first and second end faces;
   a plurality of first sprockets disposed on an outer peripheral surface of the outer race and aligned between the first and second end faces;
   a second sprocket including an opening on a side thereof;
   wherein the outer race includes a threaded opening on the second end face which aligns with the opening in the second sprocket; and
   a threaded bolt which passes through the opening in the second sprocket and into the threaded opening in the outer race for fixing the second sprocket to the outer race.

2. The apparatus according to claim 1 wherein the outer peripheral surface of the outer race comprises a first splined surface, and wherein an inner peripheral surface of each of the plurality of first sprockets comprises a second splined surface which meshes with the first splined surface.

3. The apparatus according to claim 1 wherein the second sprocket has a first side and a second side, wherein the first side of the second sprocket is retained to the second end face of the outer race, and further comprising a third sprocket retained to the second side of the second sprocket.

4. The apparatus according to claim 3 wherein the second sprocket includes a ledge having an outer peripheral surface extending from the second side of the second sprocket, and wherein the third sprocket is disposed about the outer peripheral surface of the ledge.

5. The apparatus according to claim 4 wherein the outer peripheral surface of the ledge comprises a first threaded surface, and wherein an inner peripheral surface of the third sprocket comprises a second threaded surface which meshes with the first threaded surface.

6. The apparatus according to claim 4 wherein a surface of the ledge comprises a first threaded surface, and further comprising a lock ring including:
   a generally cylindrical member having a second threaded surface which meshes with the first threaded surface; and
   a radially outwardly extending flange disposed on the cylindrical member for retaining the third sprocket to the second sprocket.

7. The apparatus according to claim 6 wherein the first threaded surface is disposed on an inner peripheral surface of the ledge, and wherein the second threaded surface is disposed on an outer peripheral surface of the cylindrical member.

8. The apparatus according to claim 4 wherein an outer peripheral surface of the ledge comprises a first threaded surface, and further comprising an annular lock ring for retaining the third sprocket to the second sprocket, the lock ring having a threaded inner peripheral surface for meshing with the first threaded surface.

9. The apparatus according to claim 4 wherein the outer peripheral surface of the ledge comprises a first splined surface, and wherein an inner peripheral surface of the third sprocket comprises a second splined surface which meshes with the first splined surface.

10. The apparatus according to claim 9 wherein a surface of the ledge comprises a first threaded surface, and further comprising a lock ring including:
    a generally cylindrical member having a second threaded surface which meshes with the first threaded surface; and
    a radially outwardly extending flange disposed on the cylindrical member for retaining the third sprocket to the second sprocket.

11. The apparatus according to claim 10 wherein the first threaded surface is disposed on an inner peripheral surface of the ledge, and wherein the second threaded surface is disposed on an outer peripheral surface of the cylindrical member.

12. The apparatus according to claim 9 wherein the outer peripheral surface of the ledge comprises a first threaded surface, and further comprising an annular lock ring for retaining the third sprocket to the second sprocket, the lock ring having a threaded inner peripheral surface for meshing with the first threaded surface.

13. The apparatus according to claim 3 wherein the third sprocket is formed as one piece with the second sprocket.

14. The apparatus according to claim 3 wherein the second sprocket includes a plurality of openings, wherein the outer race includes a plurality of threaded openings on the second end face which align with the plurality of openings in the second sprocket, wherein the plurality of openings in the second sprocket are aligned between adjacent teeth of the third sprocket, and further comprising a plurality of threaded bolts, each of which passes through one of the plurality of openings in the second sprocket and into the a corresponding one of the plurality of threaded openings in the outer race.

15. The apparatus according to claim 14 wherein the plurality of openings in the outer race are disposed at an extreme end face of the outer race.

16. The apparatus according to claim 15 wherein the first end face of the outer race is formed on a radially outwardly extending flange.

17. A multiple sprocket apparatus for a bicycle comprising:
    an inner race;
    an outer race rotatably supported by the inner race, the outer race having first and second end faces and a plurality of splines disposed on an outer peripheral surface;
    a plurality of first sprockets disposed on the outer peripheral surface of the outer race and meshing with the plurality of splines on the outer peripheral surface of the outer race, the plurality of first sprockets being aligned between the first and second end faces;
    a second sprocket;
    wherein the second end face includes fastening means for fastening the second sprocket to the outer race.

18. The apparatus according to claim 17 wherein the fastening means comprises bolts.

19. The apparatus according to claim 17 wherein the fastening means comprises a weld.

20. The apparatus according to claim 17 wherein the fastening means comprises rivets.

21. A multiple sprocket apparatus for a bicycle comprising:
    an inner race;
    an outer race rotatably supported by the inner race, the outer race having first and second end faces;
    wherein the outer race is structured for supporting a plurality of first sprockets on an outer peripheral surface thereof and aligned between the first and second end faces; and wherein the second end face includes fastening means for fastening a second sprocket thereto.

22. The apparatus according to claim 21 wherein the fastening means comprises a plurality of threaded openings disposed in the second end face.

23. The apparatus according to claim 21 wherein the outer peripheral surface of the outer race includes a plurality of splines.

* * * * *